United States Patent [19]
Zentmyer

[11] Patent Number: 5,603,246
[45] Date of Patent: Feb. 18, 1997

[54] LOCKING DIFFERENTIAL WITH RADIAL DAMPENING

[76] Inventor: John Zentmyer, 245 Fischer Ave., B-4, Costa Mesa, Calif. 92626

[21] Appl. No.: 547,591

[22] Filed: Oct. 24, 1995

[51] Int. Cl.$^6$ ................................................ F16H 48/12
[52] U.S. Cl. .......................... 74/650; 192/89.26; 192/200
[58] Field of Search ............................ 74/650; 192/48.8, 192/49, 89.2, 89.26, 200

[56] References Cited

U.S. PATENT DOCUMENTS

| | | | |
|---|---|---|---|
| 2,555,044 | 5/1951 | Lewis | 74/650 |
| 4,498,355 | 2/1985 | Schou | 74/650 |
| 4,760,906 | 8/1988 | Flotow et al. | 192/89.26 X |
| 5,413,015 | 5/1995 | Zentmyer | 74/650 |

Primary Examiner—Charles A. Marmor
Assistant Examiner—Nathan O. Jensen
Attorney, Agent, or Firm—Roger A. Marrs

[57] ABSTRACT

An automotive differential assembly for a vehicle having a driving case enclosing a pair of driving members operably coupled with a pair of driven members. The driven members are secured to output shafts and the driving members are forcibly driven by a driving shaft having its opposite ends in engagement with the driving case. The driving shaft passes through eccentric or angled apertures formed by cooperating arcuate surfaces provided in opposing surfaces of the driving members. The driving members and the driven members are urged together respectively by at least four dampening springs providing both axial and radial force which dampens or eliminates sudden impact encountered when the shaft moves back and forth within the apertures. The driving members may be loosely aligned and interrelated by pins and enlarged holes, by pins and laterally opened holes or by a key and keyway or channel construction.

12 Claims, 2 Drawing Sheets

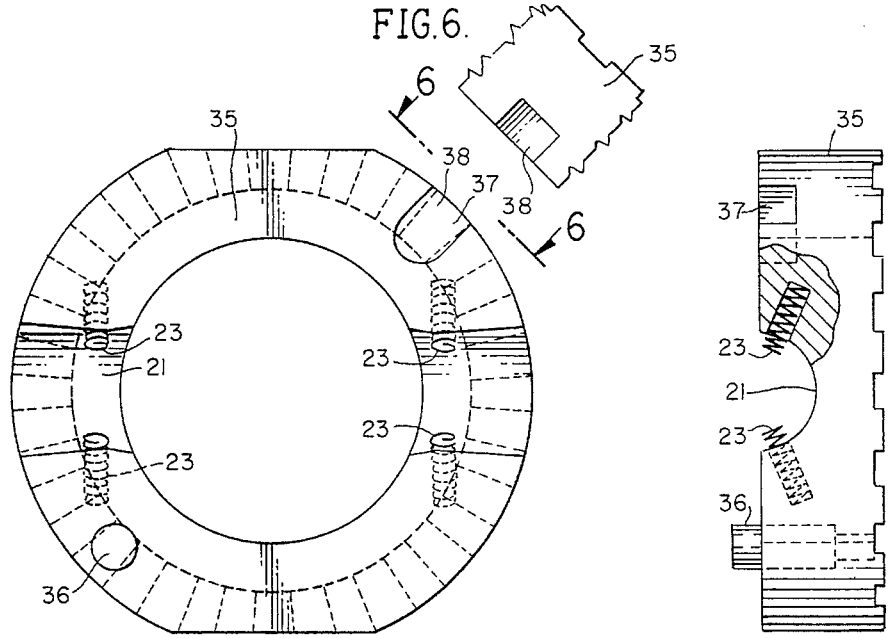
FIG. 6.
FIG. 4.  FIG. 5.
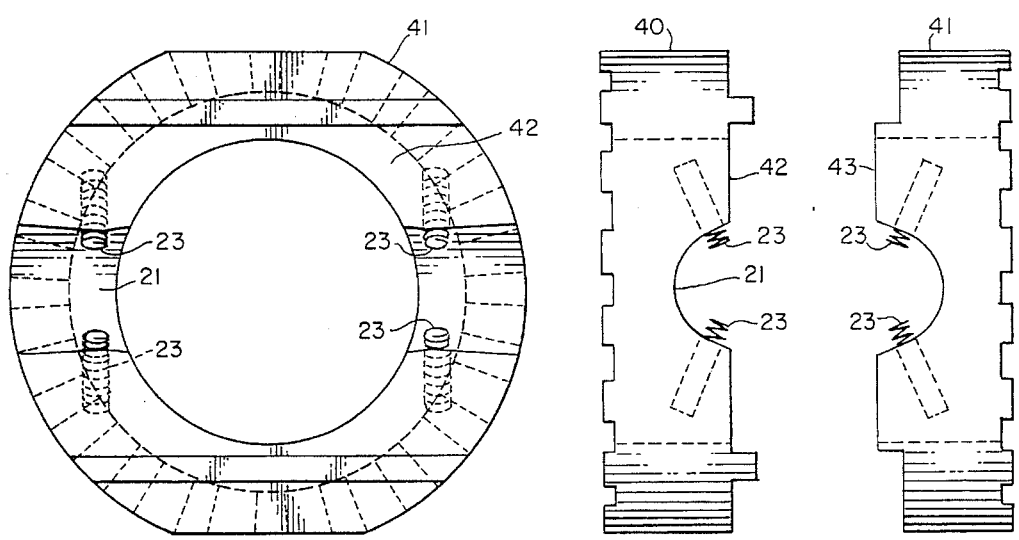
FIG. 7.  FIG. 9.  FIG. 8.

LOCKING DIFFERENTIAL WITH RADIAL DAMPENING

BACKGROUND OF THE INVENTION

1. Field of the Invention

The present invention relates to the field of automatic locking differential mechanisms for motor vehicles or the like and more particularly, to a novel differential mechanism incorporating improvements in manufacturability and assembly thereof utilizing a spring arrangement providing both axial and radial forces between the drivings members of the mechanism which greatly simplifies both original manufacture and subsequent installation in the vehicle.

2. Brief Description of the Prior Art

In the past, it has been the conventional practice to construct automatic differential mechanisms for vehicles with two locking-unlocking toothed clutch members which are driven by a common driving shaft and wherein the driving clutch members drive driven members in order to form an automatic locking differential for automotive applications. Each clutch member operates independently to drive its associated axle shaft connected to the driven member; however, the drive members are connected to one another in such a manner that a differentiating action occurs when the vehicle turns. In order to provide this differentiating action, resilient means are provided in cooperation with alignment pins to inter-couple the opposing surfaces of the driving members.

However, problems and difficulties have been encountered with the above conventional construction which stem largely from the fact that the use of conventional spring interfacing means and pin interconnection between clutch members is difficult and cumbersome to manufacture, install and service. No attempt is made to provide a radial force for dampening purposes or to eliminate sudden impact of the drive shaft as it moves in the clutch members.

It is difficult to install, replace or service damaged springs in conventional construction since access to the components in the installation is difficult requiring specific tools and specialized knowledge. Even in the initial installation, the procedure for installing the components, such as conventional pin and spring arrangements, can be time-consuming and awkward. Prior examples are disclosed in U.S. Pat. Nos. 5,413,015; 4,640,143; 4,573,562 and 3,507,486.

Therefore, a long-standing need has existed for a differential mechanism which permits convenient assembly, maintenance and repair in both manufacture and installation so as to betas simple as possible whereby the likelihood of problems is greatly reduced. Such a means should provide ready access to the parts intended to be installed and yet, overall performance must not be reduced.

SUMMARY OF THE INVENTION

Accordingly, the above problems and difficulties are avoided by the present invention which provides a novel differential mechanism having driving clutch plates or members arranged in spaced-apart position, back-to-back and separated by the presence of a driving shaft wherein the opposite ends of the shaft loosely reside within contoured cooperating openings in the clutch plates or members. The clutch plates or members are aligned and coupled together by a fitting arrangement and resilient means are included between the shaft and clutch plates or members for applying both axial and radial forces in order to eliminate or control damping forces. In one form of the invention, the resilient means take the form of a set of compression springs which are radially disposed with respect to the drive shaft, having one end bearing against the shaft while the opposite ends of the compression springs are captured in openings formed in the opposing faces of the clutch plates or members.

The fitting means between the clutch plates or members may be selected from; pins and enlarged opening construction present between the opposing faces of the plates or members; laterally opening holes and pin combinations between the opposing surfaces or faces; a key and keyway or a channel and projection arrangement.

The novel fitting arrangements between the plates or members provide for convenient installation and an installation which may be achieved without special tools or special knowledge on behalf of the installer.

Therefore, a primary object of the present invention is to provide a vehicle differential mechanism which simplifies both manufacture and installation of component parts in the differential mechanism and which provides both axial and radial applied force dampening.

Another object of the present invention is to provide a differential mechanism wherein component parts of the assembly, such as clutch members and a drive shaft, are joined together by resilient means comprising a radially disposed network or arrangement of compression springs bearing against the component parts, applied axially and radially, so that forces are either dampened, reduced or eliminated.

Another object of the present invention is the provision of resiliently supported component parts in a differential mechanism or assembly which permits convenient installation of the requisite combination of parts with ease and without the need for special tools or skills.

A further object resides in providing a resilient means for dampening the movable forces encountered between component parts such as the ends of the differential drive shaft residing in a contoured saddle of clutch members.

Yet another object of the present invention provides both an axial force and a radial force for reducing or eliminating the forces of sudden impact of a differential drive shaft as it moves within the contoured saddle or recesses of the differential clutch members.

A further object of the inventive concept resides in providing an indexing or registration means for fitting clutch members together in a differential mechanism so that the member maybe readily assembled or disassembled with respect to a differential housing or case with ease and convenience.

Another object includes providing a differential mechanism assembly with an indexing or registration means movably mounting a pair of clutch plates or members together which take the form of rigid pins disposed in enlarged holes, rigid pins disposed in holes having a lateral access opening or a slideable key and keyway combination.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 4 an end elevational view of a clutch member or plate illustrating an indexing or registration means for fitting clutch members together employing a recess having a lateral opening and a rigid pin;

FIG. 5 is a side elevational view of the differential mechanism clutch member as shown in FIG. 6;

FIG. 6 is an enlarged fragmentary view of the lateral access opening or recess in a clutch member as taken in the direction of arrows 6—6 of FIG. 4;

FIG. 7 is a view similar to the view of FIG. 4 illustrating another indexing or registration means for fitting a pair of clutch plates or members together employing a key and-keyway construction;

FIGS. 8 and 9 are side elevational views of a pair of clutch members or plates employing the key and keyway fitting arrangement as disclosed in FIG. 7.

DESCRIPTION OF THE PREFERRED EMBODIMENT

Figure 1:
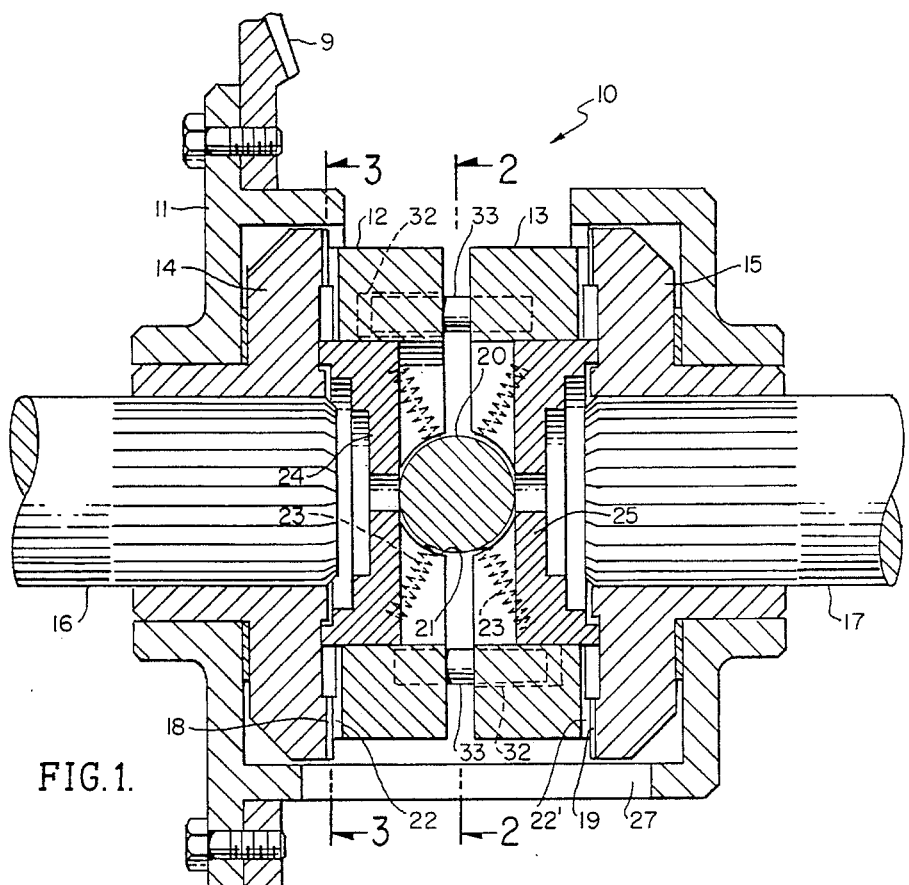
FIG. 1 is a longitudinal cross-sectional view of a differential mechanism incorporating the present invention illustrating means for dampening axial and radial forces.

With respect to FIG. 1, an automotive differential mechanism employing the present invention is illustrated which applies equal amounts of torque to each of the rear wheels of a vehicle. If one wheel spins with only a small amount of torque applied, the other wheel also receives the same amount of torque such that the vehicle will not move. However, the differential mechanism using the inventive-concept can deliver 100% of the applied torque to either wheel so as to allow the wheel with the most traction to propel the vehicle.

Figures 2, 3:
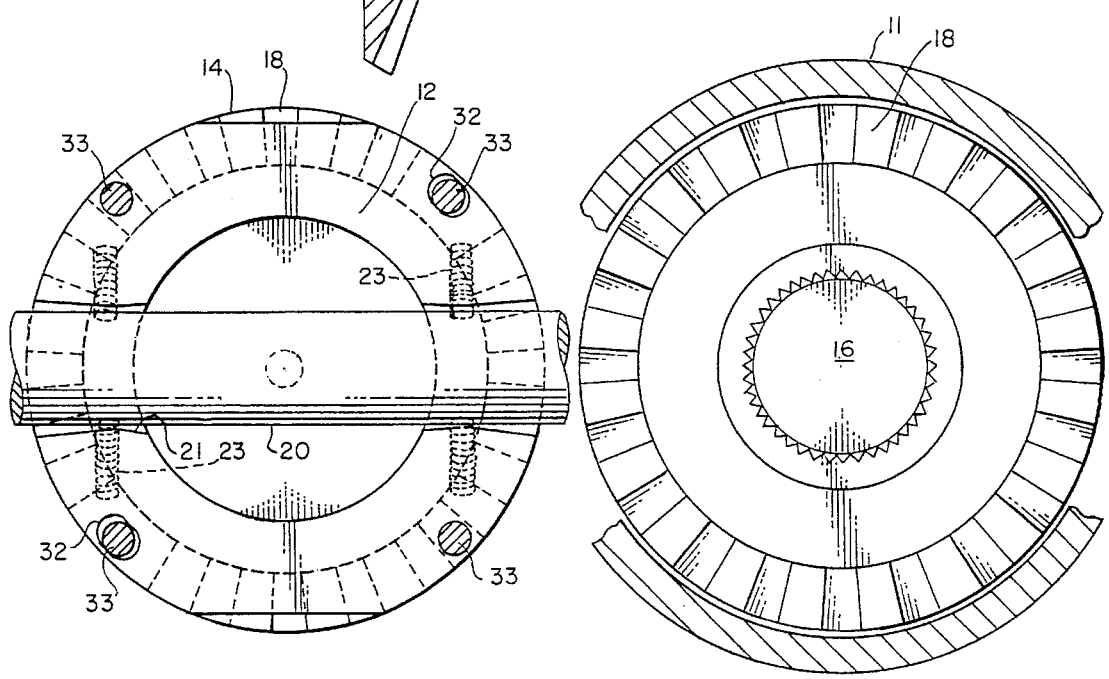
FIG. 2 a transverse cross-sectional view of the mechanism shown in FIG. 1 as taken in the direction of arrows 2—2 thereof.
FIG. 3 a transverse cross-sectional view of the mechanism shown in FIG. 1 as taken in the direction of arrows 3—3 thereof.

Referring to FIGS. 1–3 inclusive, the novel differential mechanism of the present invention is illustrated in the general direction of arrow 10 which is carried within a housing (not shown) and has an integral flange member 11 upon which a ring drive gear 9 is mounted. A pair of clutch assemblies is carried within the integral flange member and is represented by numerals 12 and 13, which are driving members of the clutch, and numerals 14 and 15, which are driven members of the clutch assembly or mechanism. Each of the respective clutch members 14 and 15 is coupled to output shafts 16 and 17 such as by being splined in engagement with the respective, driven clutch members 14 and 15. Clutch drive members 12 and 13 are in driving relationship with the clutch driven members 14 and 15 by means of meshed radial teeth indicated by numerals 18 and 19 respectively.

A driving shaft 20 acts upon an angled saddle or portion of a driving recess 21 which may be referred to as an angled recess or an eccentric journal, which causes an axial force to be exerted by the driving members 12 and 13 upon the driven members 14 and 15. This movement maintains the teeth 18 and 19 engaged and additionally provides a rotational force that causes the driving members 12 and 13 to rotate driven members 14 and 15, turning the shafts 16 and 17 and propelling the vehicle.

It is to be understood that the teeth 18 and 19 are meshed with teeth 22 and 22' on opposing surfaces of clutch members 12 and 14 and clutch members 13 and 15 respectively are urged in contact by resilient means such as the spring assembly composed of at least four diagonally mounted springs represented by the numeral 23. The compression springs act at one end against drive shaft 20 and at the other end against the driving members 14 and 15.

It is to be understood that conventional springs which provide only an axial force are normally located between the opposing surfaces of the driving members 12 and 13. However, in the inventive concept, the diagonal springs are located so as to bear against four locations of the drive shaft 20 and against the driving members 12 and 13 which are adjacent to and coaxially disposed with relation to the driven members 14 and 15 respectively. The inventive concept employing diagonally disposed springs provides both an axial force and a radial force which dampens, reduces or aids in eliminating the sudden impact forces generated by the drive shaft or rod 20 as it rotates back and forth in the recesses or saddles 21 of the differential mechanism. The recesses or saddles 21 are slightly wider or over-sized than the diameter of the rod or drive shaft ends. The drive shaft is free to move or wobble back and forth within the limits of the over-sized saddle or recess and such movement produces a noticeable "clunk" when the vehicle accelerates or decelerates. This "clunk" impact of the shaft which heretofore has remained undampened, is greatly reduced or eliminated by the radial force exerted by the diagonal springs.

By providing an opening 27 in the structure 11, the various component parts of the differential mechanism may be introduced into a cavity between the opposing ends of the shafts 16 and 17. However, in order to install drive members 12 and 13 so that they are properly oriented with respect to the drive shaft 20, indexing or registration means are provided taking the form of enlarged openings 32 in which rigid pins 33 are inserted during the installation procedure. Numerals 24 and 25 identify spacers on which driving members 12 and 13 are carried.

By maintaining a loose fit between the pins and recesses or holes, a workman can readily pre-align the component parts and introduce them into the cavity between the axle shafts 16 and 17 via the opening 27. The radial spring arrangement dampens or eliminates any noise or impact loads.

In FIGS. 2 and 3, it can be seen that the springs 23 serve as a sort of balancing resilient means which achieve self-centering of the shaft 20 within the saddles or recesses 21. Also, it can be seen that the springs 23 are in compression and that the springs cooperate together. The saddles or recesses 21 are enlarged at their opposite ends and reduced in diameter at their midsections so as to accommodate wobbling or movement of the opposite ends of the drive shaft 20.

Referring now in detail to FIGS. 4 and 5, another indexing or registration means is disclosed for loosely fitting the driving members 12 or 13 together. In FIGS. 4 and 5, a single driving member is illustrated and it is to be understood that the other driving member is identical in construction. A driving member is identified by numeral 35 and includes a face having an outwardly projecting pin 36, and located approximately 180° degrees on the opposite face of the driving member, there is a receptacle 37. It can be seen that the receptacle includes an opening leading laterally to the edge of the driving-member and the opening is identified by numeral 38. The opening is more clearly illustrated in FIG. 6 wherein it can be seen that when the pin 36 of one driving member is introduced to the recess 37, it may readily be slid through the opening 38 for proper alignment. This indexing and registration is advantageous when the pair of driving members is inserted through the opening 27 in the structure 11 during installation or removal for maintenance or repair. The springs 23 are utilized in the same manner as described above and the recesses 21 are also utilized as previously described.

Referring now in detail to FIGS. 7, 8 and 9, another indexing or registration means is illustrated for fitting a pair of drive members together drive members indicated by numerals 40 and 41 wherein one face of the drive member 40 includes a channel or keyway 42 into which a projection or key 43 is received. As previously described, the springs 23 as well as the recesses 21 are also employed with each of the driving members. The springs 23 are insertably received within recesses within each of the respective drive members and outwardly project into the respective recesses 21.

In view of the foregoing, it can be seen that the practice of assembly of the differential mechanism simplifies both manufacture and installation and that the assembly and installation may be performed by unskilled persons using simple handtools rather than complicated specialized tools so that a viable, marketable product which functions well is provided. By employing the diagonally disposed spring network or arrangement, both axial and radial forces are applied by the drive shaft 20 to the driving members, This version, as shown in FIG. 1, eliminates the pins shown in FIGS. 2 and 4.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A differential mechanism comprising:

output means;

driving means driven means operably responsive to said driving means for powering said output means;

said driving means having a pair of clutch driving members coaxially disposed with respect to each other and having opposing spaced-apart surface faces;

said driving means further including a drive shaft disposed between said pair of clutch driving members;

biasing means interposed between said driving members and said drive shaft providing both axial and radial forces to dampen relative movement between said clutch driving members and said drive shaft; and said biasing means comprising multiple elongated compression springs having central axes off-set from said opposing spaced-apart surface faces of said pair of clutch members.

2. The invention as defined in claim 1 wherein:

said indexing means includes a channel provided in a selected face of one of said opposing spaced-apart surface faces and a projection provided in the other face of said opposing spaced-apart surface faces whereby said channel and said projection are mateable to register and align said pair of clutch driving members.

3. The invention as defined in claim 1 wherein:

said biasing means includes at least four compression springs and each spring having opposite ends with said opposite ends bearing against said drive shaft and said clutch driving members respectively;

each of said compression springs being angularly disposed with respect to one, another about a longitudinal center axis of said drive shaft.

4. The invention as defined in claim 3 wherein:

said clutch driving members include a semi-circular recess cooperating to form a pair of recesses having open tapered ends with a reduced midsection; and said drive shaft having opposite ends occupying said recesses.

5. The invention as defined in claim 3 including:

indexing means interconnecting said pair of clutch driving members and disposed between said opposing spaced-apart surface faces.

6. The invention as defined in claim 5 wherein:

said indexing means includes at least one rigid pin projecting outwardly from a selected one of said opposing spaced-apart surface faces and at least one recess with a lateral opening provided in the other one of said opposing spaced-apart surface faces;

said pin insertably received within said recess via said lateral opening; and said recess being of greater diameter than the diameter of said pin.

7. A locking differential mechanism with radial dampening comprising:

a pair of driving members coaxially disposed with respect to each other and having opposing spaced-apart surface faces;

an elongated drive shaft disposed between said opposite spaced-apart surface faces and lying perpendicular across a central axis of said pair of driving members;

a resilient arrangement means compressed between said opposing spaced-apart surface faces and said drive shaft for applying both axial and radial forces to said drive shaft; and said resilient arrangement means being radially disposed with respect to a longitudinal axis of said drive shaft.

8. The invention as defined in claim 7 including:

indexing means for registering said driving members together in a coaxial relationship;

said indexing means includes a selected one of said driving members having a front face with an open-ended channel and the other driving member having a front face with a projection adapted to be insertably receivable within said channel.

9. The invention as defined in claim 7 including:

a projection carried on one driving member of said pair and a channel provided on the other driving member of said pair; and said projection and said channel being alignable to fit together for registering said pair of driving members with respect to each other in coaxial relationship.

10. The invention as defined in claim 7 wherein:

each of said driving members includes a pair of recesses occupied by opposite ends of said elongated drive shaft;

whereby said recesses of each driving member mate with each other to provide a pair of aligned receptacles; and each receptacle being open-ended and separated by a reduced midsection permitting said drive shaft to be centered in response to said resilient arrangement means.

11. The invention as defined in claim 10 including:

indexing means cooperatively carried on said opposing spaced-apart surface faces for coaxially aligning said driving members with respect to each other and for loosely fitting said drive members together.

12. The invention as defined in claim 11 wherein:

said indexing means is selected from:
 a. pin and enlarged hole combination;
 b. pin and hole with lateral opening;
 c. projection and channel combination.

* * * * *